United States Patent [19]
Stewart et al.

[11] Patent Number: 5,267,070
[45] Date of Patent: Nov. 30, 1993

[54] UNDERWATER IR COMMUNICATION SYSTEM

[75] Inventors: Ian H. Stewart; James G. Miller, both of Oxnard; Roman Kruchowy, Somis, all of Calif.

[73] Assignee: The United States of America as represented by the Secretary of the Navy, Washington, D.C.

[21] Appl. No.: 878,697

[22] Filed: May 5, 1992

[51] Int. Cl.$^5$ .............................................. H04B 10/00
[52] U.S. Cl. ..................................... 359/141; 359/152; 359/158
[58] Field of Search ............... 359/141, 152, 154, 158, 359/165, 168; 375/7

[56] References Cited

U.S. PATENT DOCUMENTS 4,975,926  12/1990  Knapp ................................. 359/159

OTHER PUBLICATIONS

Infrared Microbroadcasting Network for in-house data communication, IBM Zurich Research Laboratory, 8803 Rüschikon, Switzerland.

Primary Examiner—Richard E. Chilcot, Jr.
Assistant Examiner—Rafael Bacares
Attorney, Agent, or Firm—David S. Kalmbaugh; Melvin J. Sliwka

[57] ABSTRACT

An underwater communications system comprising first and second communications modules which transmit and receive data utilizing infrared radiation. Each module has a transmitter/receiver which converts each received data byte to RS-232 formatted data for transmission to a computer. Each communication module also includes a timer for providing a forty kilohertz pulsed signal to modulation circuitry which passes the pulsed signal through the modulation circuitry when a logic zero is supplied to the modulation circuitry and which inhibits the pulsed signal when a logic one is supplied to the circuitry. That portion of the pulsed signal which passes through the modulation circuitry is provided to a light emitting diode which transmits a pulsed burst of infrared radiation to an infrared light detecting unit within the second communications module. The infrared light detecting unit then provides a logic zero at its output when its receives a pulsed burst of infrared radiation for time period of approximately six hundred microseconds and a logic one when the unit fails to detect a pulsed burst of infrared radiation for a time period of six hundred microseconds.

14 Claims, 3 Drawing Sheets

UNDERWATER IR COMMUNICATION SYSTEM

BACKGROUND OF THE INVENTION

1. Field of the Invention

This invention relates generally to communications systems and more particularly to a wireless underwater communications system which uses infrared radiation to transmit information between a transmission unit and a reception unit.

2. Description of the Prior Art

Until now, underwater communications and data transmission systems have been one of three major types.

The first type of underwater communications system includes a metal wire electrical connector extending between a transmission unit and a reception unit. A problem with this "hard wired" system is that the rigors of underwater environments are such that the electrical connector will frequently break, especially when extended to great depths or over long distances.

The second type of underwater communications system uses an acoustic transmission apparatus such as sonar which allows for underwater communication over short distances. A problem with acoustic transmission is that the intelligibility of the transmissions is often low due to the ambient noises, reverberations and thermocline echoes generated by underwater environments.

The third type of underwater communications system utilizes the body of water as a conductor for electric field transmissions. These communications systems are generally an improvement over hard wired and acoustic transmission systems because these prior art underwater communications systems are relatively immune to the stresses and noises of an underwater environment. However, these prior art underwater communications systems often require complex electronic circuitry to transfer information, are expensive and are generally packaged in bulky containers which limits their use by divers or the like.

Accordingly, there is a need to provide an improved underwater communications system which is inexpensive, is easy to transport and will provide reliable communications in the rigors associated with an underwater environment.

SUMMARY OF THE INVENTION

The present invention overcomes some of the disadvantages of the prior art, including those mentioned above in that it comprises an efficient yet relatively simple communications system for use in an underwater environment or the like. Included in the underwater IR (infrared) communications system of the present invention are first and second underwater communications modules which transmit and receive data utilizing infrared radiation. Each module has a transmitter/receiver which is compatible with the Electronics Industries Association RS-232 interface format and which converts each data byte received thereby to TTL voltage levels and also converts TTL data bits to RS-232 formatted data for transmission to a computer or the like. Each data byte includes a start bit, an eight bit ASCII character and at least one stop bit.

Each communications module also includes a timer for providing a forty kilohertz pulsed signal to modulation circuitry which passes the pulsed signal therethrough when a logic zero data or start bit is supplied to the modulation circuitry and which inhibits the passage of the pulse signal when a logic one data or stop bit is supplied to the modulation circuitry. That portion of the pulsed signal which passes through the modulation circuitry is provided to a light emitting diode which transmits pulsed bursts of infrared radiation to an infrared light detecting unit within the second communications module. The infrared light detecting unit provides a logic zero at its output when it receives a pulsed burst of infrared radiation for time period of approximately six hundred microseconds and a logic one at its output when the unit fails to detect a pulsed burst of infrared radiation for a time period of six hundred microseconds. The data byte is then provided to a transmitter/receiver in the second module for conversion to the RS-232 standard and then transmission to a computer or the like.

DETAILED DESCRIPTION OF THE PREFERRED EMBODIMENT

The preferred embodiment of the present invention will now be discussed in conjunction with all of the figures of the drawings.

Figure 1:
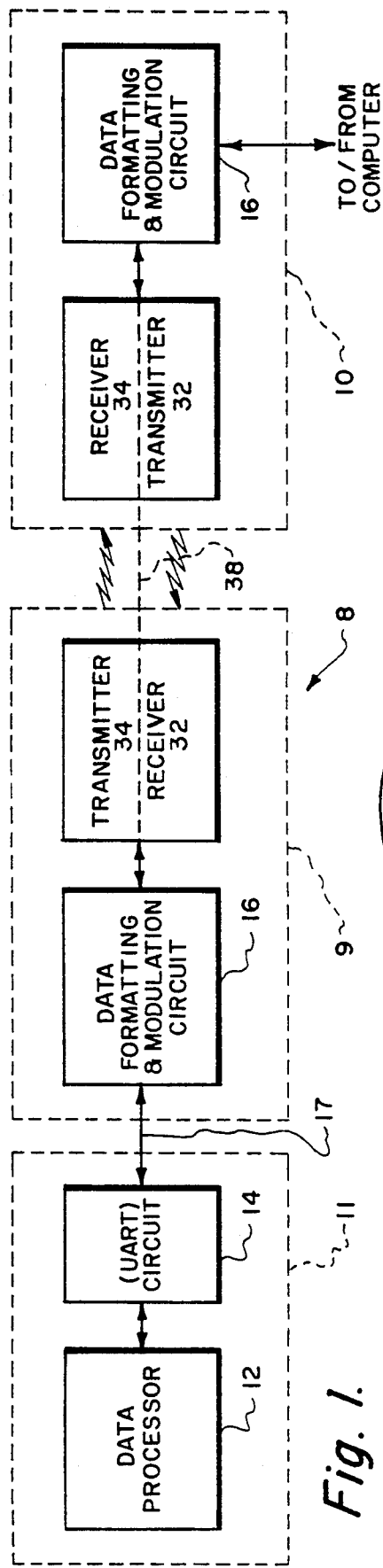
FIG. 1 is a block diagram illustrating the underwater IR communications system constituting the present invention.
Figure 2:
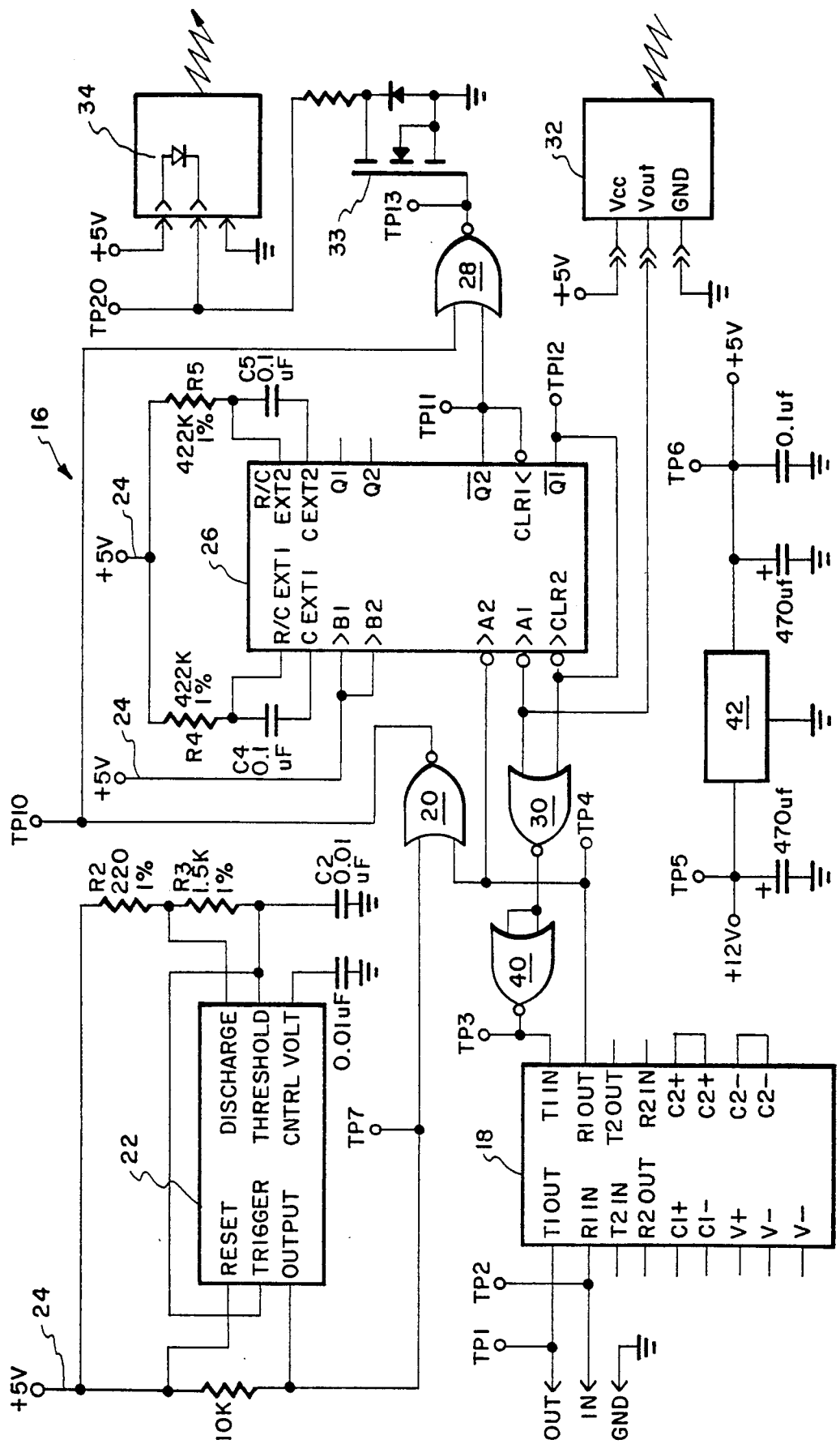
FIG. 2 is a detailed electrical schematic diagram of the transmit/receive unit of the present invention.

Referring to FIGS. 1 and 2 there is shown an underwater IR (infrared) underwater communications system, designated generally as 8, which may be used to communicate information in an underwater environment and which includes a pair of identical underwater communications modules 9 and 10. A digital computer 11 which includes a data processor 12 and universal asynchronous receiver transceiver (UART) circuit 14 is used to generate the information to be transmitted by underwater communications module 9 or to process information received by underwater communications module 9. Universal asynchronous receiver transceiver circuit 14 formats digital data into the RS-232 communications interface which is a well known and widely used interface standard for communicating between a digital computer and peripheral devices which transmit and receive data via serial ports.

Data provided to UART 14 from data processor 12 is transmitted to a data formatting and modulation circuit 16 via a cable 17. Data formatting and modulation circuit 16 which is submerged in the underwater environment comprises a transmitter/receiver 18 which is RS-232 compatible and which is adapted to receive data from UART 14 or transmit data to UART 14 with data being in the RS-232 format.

At this time it should be noted that the RS-232 interface employs negative logic levels whereby a positive voltage of between plus three volts to plus twenty five volts is defined as a logic zero and a negative voltage of between minus three volts and minus twenty five volts is a logic one. A voltage of between plus three volts and minus three volts is in the transition region as defined by the RS-232 interface.

Data received from UART 16 is converted by transmitter/receiver 18 to TTL voltage levels, that is a logic zero is approximately zero volts and a logic one is approximately five volts. As is best illustrated by FIG. 3(A) each byte of data supplied to circuit 16 by computer 11 includes a start bit which is a logic zero, followed by at least eight binary data bits which are either logic ones or logic zeros. The data bits are next followed by at least one stop bit with each stop bit being a logic one. In the preferred embodiment of the present invention the eight binary data bits of each byte of data provided to communications system 10 are ASCII characters. For example, the character "A" is binary 01000001 while the control character "^@" is binary 00000000. In addition, it should be noted that data is either provided by computer 11 to system 10 or transmitted to computer 11 by system 10 at a rate of six hundred bits per second.

The digital data of FIG. 3(A) which appears at the R1 output of transmitter/receiver 18 is then supplied to the first input of a NOR gate 20 which has supplied to the second input thereof a forty kilohertz pulsed signal, FIG. 2(B), generated by a timer circuit 22.

Figure 3:
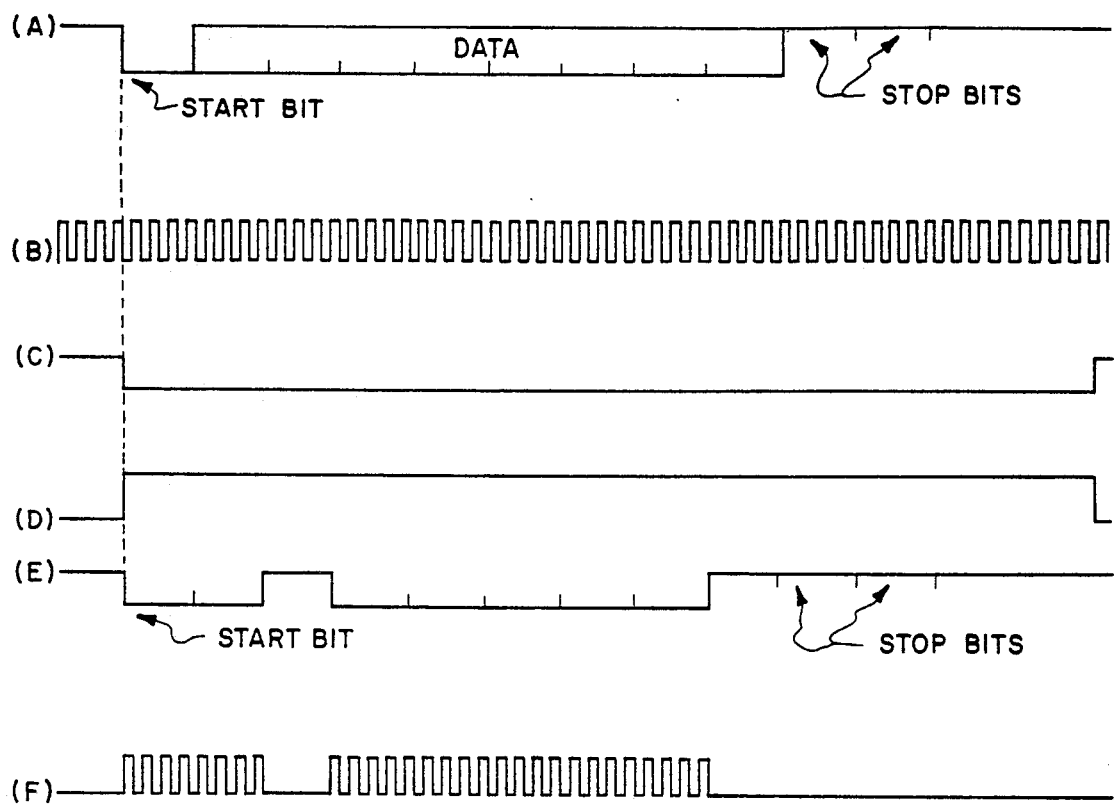
FIGS. 3(A)-3(F) is a graphical representation of the signals which occur at the outputs of some of the electrical components of the communications system of FIG. 1 when the communications system of FIG. 1 is transmitting data.

Referring to FIGS. 2 and 3, timer circuit 22 includes a 220 ohm resistor R2 electrically connected between a direct current voltage source 24 and the discharge terminal of timer circuit 22. A 1.5 K-ohm resistor R3 is connected between the discharge terminal of timer 22 and the threshold input of timer 22, while a 0.01 $\mu f$ capacitor C2 is connected between ground and the threshold input of timer 22. The frequency of the pulsed signal generated by timer 22 is calculated in accordance with the following equations:

$$t_1 = 0.693(R_A + R_B)C_t \quad (1)$$

$$t_2 = 0.693 R_B C_t \quad (2)$$

$$T = t_1 + t_2 = 0.693(R_A + 2R_B)C_t \quad (3)$$

$$f = \frac{1}{T} = \frac{1}{0.693(R_A + 2R_B)C_T} \quad (4)$$

where $t_1$ is the high level output period of the pulsed signal, $t_2$ is the low level output period of the pulsed signal, $R_A$ is the value resistor R2, $R_B$ is the value of the of resistor R3 and $C_t$ is the value of capacitor C2. The values of $t_1$ and $t_2$ are equal since the duty cycle for the pulse signal generated by timer 22 is fifty percent.

When the R1 output of transmitter/receiver 18 transitions from a logic one to a logic zero, a high to low transition is provided to the A2 input of a retriggerable monostable multivibrator 26. The high to low transition at the A2 input of multivibrator 26 causes the not Q2 output of multivibrator 26 to transition from a logic one to logic zero as shown by FIG. 3(C). The logic zero at the not Q2 output of multivibrator 26 is maintained for approximately 40 milliseconds in accordance with the following equation:

$$PW = (R_{EXT})(C_{EXT}) \quad (5)$$

where PW is the pulse width of the pulse appearing at the Q2 output of multivibrator 26 in seconds, $R_{EXT}$ is the value of resistor R5 in ohms and $C_{EXT}$ is the value of capacitor C5 in farads. In a like manner, the pulse width of a pulse occurring at the Q1 output will be approximately 40 microseconds since R4 and R5 are each 422 K-ohms and C4 and C5 are each 0.1 $\mu f$.

The logic zero appearing at the not Q2 output of multivibrator 26 is supplied to the first input of a NOR gate 28 and the CLR1 input of multivibrator 26, which, in turn, causes the not Q1 output of multivibrator 26 to transition from the logic zero state to the logic one state for at least 40 milliseconds as is best illustrated by FIG. 3(D). The logic one of FIG. 3(D) which occurs at the not Q1 output of multivibrator 26 is supplied to the first input of a NOR gate 30 thereby inhibiting NOR gate 30 which prevents digital data provided by a light detecting receiver 32 from passing through NOR gate 30. The logic one of FIG. 3(D) is also supplied to the CLR1 input of multivibrator 26, thereby insuring that the not Q1 output of multivibrator will stay at the logic one state will the data byte of FIG. 3(A) is transmitted by underwater communications module 9 to an adjacent underwater communications module 10.

For the purpose of illustrating the operation of underwater IR communications system 10, there is shown the eight bit binary ASCII code for the character "A" which is 01000001. The start bit of FIG. 3(E) enables NOR gate 28 allowing the signal of FIG. 2(B) to pass through NOR gates 20 and 28 whenever a logic zero data bit is provided to the first input of NOR gate 20 thereby enabling NOR gate 20. This results in the signal of FIG. 3(F) appearing at the output of NOR gate 28 which is then provided to the gate of field effect transistor 33. When a logic one, that is a plus five volts, is provided to the gate of field effect transistor 33, transistor 33 is turned on allowing current to flow from source 24 through light emitting diode 34 and then through transistor 33 to ground, thereby energizing light emitting diode 34. Similarly, a logic zero applied to the base of field effect transistor 33 turns off transistor 33. Thus, whenever a logic zero or a start bit is provided to underwater IR communications system 10 by computer 11, light emitting diode 34 provides a burst of infrared radiation at a frequency of forty kilohertz, while the absence of a forty kilohertz burst of infrared radiation signals that light emitting diode is transmitting a logic one.

Monostable multivibrator 26 is retriggered whenever there is a transition from high to low at the A2 input of multivibrator 26. Each high to low at the A2 input of multivibrator 26 extends the pulse width of the pulse, FIG. 3(D), appearing at the not Q output by approximately forty milliseconds thus ensuring that underwater communications system 10 completes transmission of an eight bit data byte before processing a data byte detected by receiver 32.

At this time it should be noted that the transmitter/receiver 18 utilized by IR underwater communications system is a Maxim RS-232 Driver/Receiver model MAX232, the timer circuit 22 is a National Semiconductor Model LM555 Timer and the monostable multivibrator 26 is a National Semiconductor Model MM74HC123A dual retriggerable monostable multivibrator. In addition, it should be noted that light emitting diode 34 is a Sharp Model GL381 infrared light emitting diode and that receiver 32 is a Sharp Model GP1U52X Light Detecting Unit, although it should be understood that each of the components of underwater communications system 10 are commercially available from several manufacturers.

Figure 4:
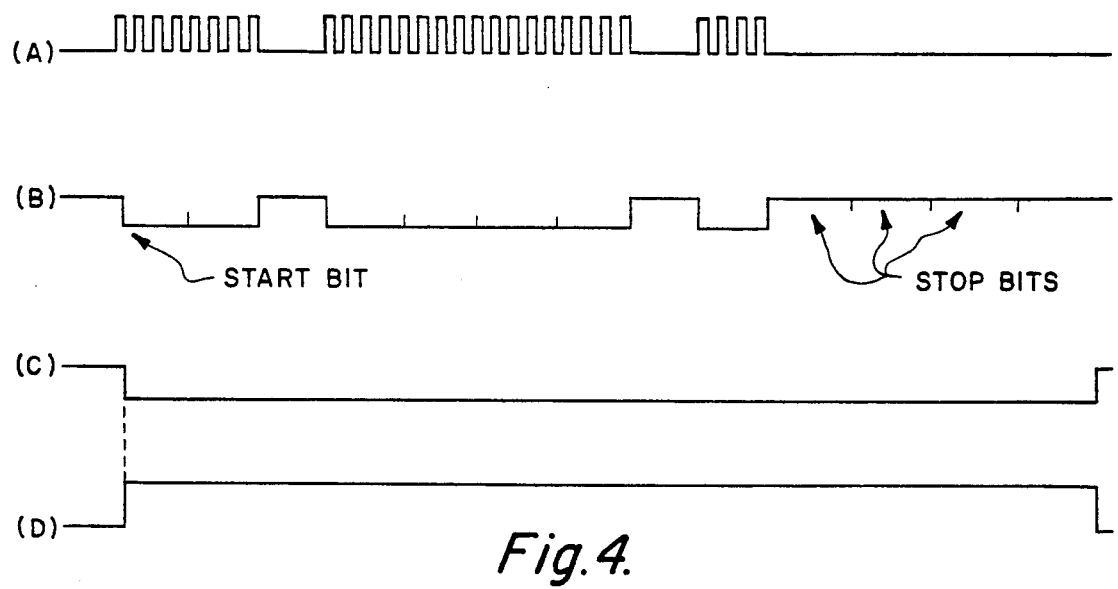
FIGS. 4(A)-4(D) is a graphical representation of the signals which occur at the outputs of some of the electrical components of the communications system of FIG. 1 when the communications system of FIG. 1 is receiving data.

Referring to FIGS. 2 and 4, there is illustrated in FIG. 4(A) the infrared radiation waveform for the ASCII character "B" provided by a second underwater IR communications module 10, FIG. 1, which is identical to module 9 and which is positioned downstream from module 9 along a light transmitting path 38. Receiver 32 upon receiving the infrared waveform of FIG. 4(A) first provides a logic zero start bit at its output followed by the ASCII binary code for the character "B" which is 01000010 and then at least one logic one stop bit. Receiver 32, in turn, provides a logic zero whenever receiver 32 detects a burst of infrared pulses at a frequency of approximately forty kilohertz for a time period of approximately six hundred microseconds. Likewise, receiver 32 provides a logic one whenever receiver 32 fails to detect a burst of infrared pulses for time period of approximately six hundred microseconds. Thus, for the character "B" receiver 32 will provide at its electrical output the digital logic waveform illustrated by FIG. 4(B).

Referring to FIGS. 2 and 4(B), the high to low transition proceeding the start bit when supplied to the A1 input of multivibrator 26 causes the not Q1 output of multivibrator 26 to transition from the logic one state to the logic zero state for a time period of least forty milliseconds as is best illustrated by FIG. 4(C). It should be understood that for each high to low transition that occurs within the data byte of FIG. 4(B), there is an extension of the pulse width of the signal of FIG. 4(C) by forty milliseconds since multivibrator 26 is retriggerable. Thus for the character "B" there are two extensions of the pulse width of signal of FIG. 4(C) since there are two high to low transitions within the character "B".

The logic zero of FIG. 4(C) is supplied to the CLR2 input of multivibrator 26 causing the not Q2 output of multivibrator 26 to transition from the logic zero to the logic one state as is best illustrated by FIG. 4(D). The logic one is supplied to the first input of NOR gate 28 thereby inhibiting NOR gate 28 during the time period underwater communications module 9 is receiving and then formatting data for transfer to computer 11.

The logic zero of FIG. 4(C) which occurs at the not Q1 output of multivibrator 26 is supplied to the first input of a NOR gate 30 thereby enabling NOR gate 30 which allows the digital data provided by a light detecting receiver 32 to pass through NOR gates 30 and 40 to the T1IN input of transmitter/receiver 18. Transmitter/receiver 18 then formats the data in accordance with the RS-232 interface standard for transfer via cable 17, FIG. 1, to computer 11, FIG. 1, for processing by computer 11.

At this time it should be noted that any apparatus which is compatible with the RS-232 interface standard including digital computers and their peripheral devices may be utilized with IR communications system 8 to transmit and receive information in an underwater environment. It should also be noted that circuit 16 includes a voltage regulator 42 which functions as source 24 by providing a regulated five volts DC to the electronic components of circuit 16.

Figure 5:
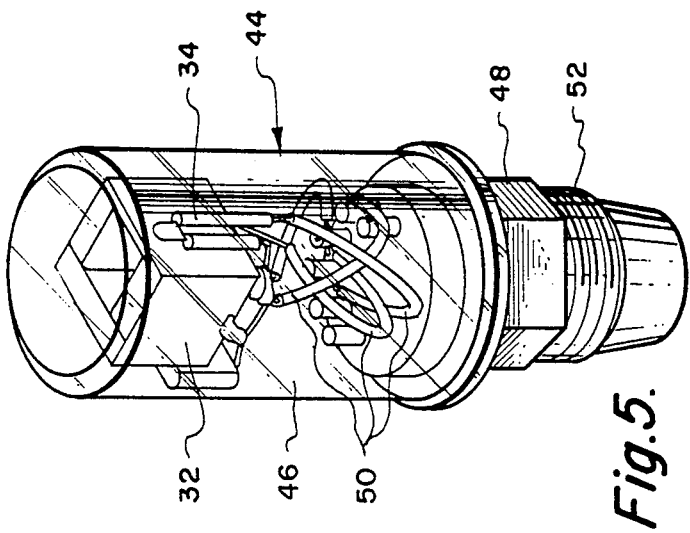
FIG. 5 is an isometric view of the water tight housing for the light emitting diode transmitter and the light detecting receiver unit utilized by the underwater IR communications system of FIG. 1.

Referring to FIG. 5, there is shown a water tight housing 44 which has mounted therein transmitter 34 and receiver 32. Housing 44 includes a cylindrical shaped thermoplastic element 46 such as plexiglas which allows infrared energy to be transmitted therethrough. The bottom end of element 46 is sealed to electrical coupling element 48 by a thermosetting resin such as epoxy which is corrosion resistant. Electrical leads, designated by the reference numeral 50, are provided to electrically connect light emitting diode 3 and light detecting receiver 32 to the electrical components of circuit 16. Coupling element 48 of housing 44 includes at the bottom portion thereof threads 52 which allow housing 44 to be threadably connected to a water tight housing, not shown, for circuit 16.

From the foregoing, it may readily be seen that the present invention comprises a new, unique and exceedingly useful underwater communications system utilizing infrared energy to transmit information which constitutes a considerable improvement over the known prior art. Obviously, many modifications and variations of the present invention are possible in light of the above teachings. Therefore, it is to be understood that within the scope of the appended claims that the invention may be practiced otherwise than as specifically described.

What is claimed is:

1. An underwater communications system which uses infrared energy to transmit and receive digital information in an underwater environment, said digital information comprising a plurality of digital data bits generated by or provided to a digital computer, said underwater communications system having at least two communications modules, each of said communications modules comprising:

transmitter/receiver means for providing an interface between said digital computer and said communications module, said transmitter/receiver means being adapted to format said digital data bits for transmission between said digital computer and said transmitter/receiver means;

timing circuit means for providing a pulsed-signal, said pulsed signal having a predetermined frequency;

modulating means for receiving said pulsed signal from said timing circuit means and said digital data bits from said transmitter/receiver means;

said modulating means in response to each digital data bit received from said transmitter/receiver means either inhibiting or passing therethrough said pulsed signal, each portion of said pulsed signal passed through or inhibited by said modulating means having a first time period equal to the pulse width of each digital data bit received from said transmitter/receiver means;

light emitting diode means for receiving that portion of said pulsed signal passing through said modulating means and generating a pulsed burst of infrared radiation in response to said pulsed signal received by said light emitting diode means; and light detecting means for detecting the presence or absence of said pulsed bursts of infrared radiation generated by the other of said communications modules, for providing a logic bit having a first logic state when said light detecting means detects any of said pulsed bursts of infrared energy generated by said other communications module for a second time period, and for providing a logic bit having a second logic state when said light detecting means fails to detect said infrared radiation for said second time period;

said modulating means for allowing the digital data bits provided by said light detecting means to pass therethrough to said transmitter/receiver means only when said communications module is not transmitting information through said underwater environment to said other communications module.

2. The underwater communications system of claim 1 wherein said transmitter/receiver means formats the digital data bytes transmitted between said computer and said transmitter/receiver means in accordance with the electrical signal characteristics, data protocols and formats of RS-232.

3. The underwater communications system of claim 1 wherein the predetermined frequency of said pulsed signal is forty kilohertz.

4. The underwater communications system of claim 1 wherein said second time period is six hundred microseconds.

5. The underwater communications system of claim 1 wherein eight digital data bits comprise a data byte, said data byte being an ASCII character.

6. The underwater communications system of claim 1 wherein each of said data bytes is proceeded by a start bit and at least one stop bit.

7. The underwater communications system of claim 1 wherein said timing circuit means comprises:
   a timer circuit having a discharge terminal, a threshold input, a trigger input, and an output, the threshold input of said timer being connected to the trigger input of said timer and the output of said timer providing said pulsed signal to said modulating means;
   a direct current voltage source;
   a first resistor connected between the discharge terminal of said timer and said direct current voltage source;
   a second resistor connected between the discharge terminal and the threshold input of said timer; and
   a first capacitor connected between ground and the threshold input of said timer;

8. The underwater communications system of claim 1 wherein said modulating means comprises:
   a first NOR gate having a first input adapted to receive digital data bits from said transmitter/receiver means, a second input adapted to receive said pulsed signal from said timing circuit means and an output;
   a dual retriggerable monostable multivibrator having an A1 input, an A2 input adapted to receive digital data bits from said transmitter/receiver means, an R/C EXT1 terminal, an R/C EXT2 terminal, a C EXT1 terminal, a C EXT2 terminal, a CLR1 input, a CLR2 input, a not Q1 output and a not Q2 output, the not Q1 output of said multivibrator being connected to the CLR2 of said multivibrator; a direct current voltage source;
   a first resistor connected between said direct current voltage source and the R/C EXT1 terminal of said multivibrator;
   a second resistor connected between said direct current voltage source and the R/C EXT2 terminal of said multivibrator;
   a first capacitor connected between the R/C EXT1 terminal and the C EXT1 terminal of said multivibrator;
   a second capacitor connected between the R/C EXT2 terminal and the C EXT2 terminal of said multivibrator;
   a second NOR gate having a first input connected to the not Q2 output of said multivibrator, a second input connected to the output of said first NOR gate and an output adapted to provide that portion of said pulsed signal passed through said modulating means to said light detecting diode means;
   a third NOR gate having a first input adapted to receive the digital data bits provided by said light detecting means, a second input connected to the not Q1 output of said multivibrator and an output; and
   a fourth NOR gate having a pair of inputs connected to the output of said third NOR gate and an output adapted to provide said digital data bits from said light detecting means to said transmitter/receiver means.

9. The underwater communications system of claim 1 further characterized by a water tight housing having said light emitting diode means and said light detecting means mounted therein, said housing comprising:
   a cylindrical shaped thermoplastic element for allowing infrared radiation to be transmitted therethrough; and
   an electrical coupling element in sealed engagement with the bottom end of said cylindrical shaped thermoplastic element;
   the lower portion of said electrical coupling element being threaded.

10. The underwater communications system of claim 1 wherein said logic bit having a first logic state is a logic zero bit and said logic bit having a second logic state is a logic one bit.

11. An underwater communications system which uses infrared energy to transmit and receive digital data bytes, said underwater communications system having at least two communications modules wherein said communications modules transmits and receive said digital data bytes through an underwater environment, each of said communications modules comprising:
   a transmitter/receiver having a transmit data input, a transmit data output, a receive data input and a receive data output;
   a timer circuit having a discharge terminal, a threshold input, a trigger input, and an output, the threshold input of said timer being connected to the trigger input of said timer;
   a direct current voltage source;
   a first resistor connected between the discharge terminal of said timer and said direct current voltage source;
   a second resistor connected between the discharge terminal and the threshold input of said timer;
   a first capacitor connected between ground and the threshold input of said timer;
   a first NOR gate having a first input connected to receive data output of said transmitter/receiver, a second input connected to the output of said timer and an output;
   a dual retriggerable monostable multivibrator having an A1 input, an A2 input connected to the receive data output of said transmitter/receiver, an R/C EXT1 terminal, an R/C EXT2 terminal, a C EXT1 terminal, a C EXT2 terminal, a CLR1 input, a CLR2 input, a not Q1 output and a not Q2 output, the not Q1 output of said multivibrator being connected to the CLR2 of said multivibrator;

a third resistor connected between said direct current voltage source and the R/C EXT1 terminal of said multivibrator;

a fourth resistor connected between said direct current voltage source and the R/C EXT2 terminal of said multivibrator;

a second capacitor connected between the R/C EXT1 terminal and the C EXT1 terminal of said multivibrator;

a third capacitor connected between the R/C EXT2 terminal and the C EXT2 terminal of said multivibrator;

a second NOR gate having a first input connected to the not Q2 output of said multivibrator, a second input connected to the output of said first NOR gate and an output;

a field effect transistor having a gate connected to the output of said second NOR gate, a source connected to ground and a drain;

a light emitting diode having an anode connected to said direct current voltage source and a cathode connected to the drain of said field effect transistor;

a light detecting unit having an input connected to said direct current voltage source and an output connected to the A1 input of said multivibrator;

a third NOR gate having a first input connected to the output of said light detecting unit, a second input connected to the not Q1 output of said multivibrator and an output; and a fourth NOR gate having a pair of inputs connected to the output of said third NOR gate and an output connected to the transmit data input of said transmitter/receiver.

12. The underwater communications system of claim 11 further characterized by a digital computer having an input connected to the transmit data output of said transmitter/receiver and an output connected to the receive data input of said transmitter/receiver.

13. The underwater communications system of claim 11 wherein said direct current voltage source comprises a voltage regulator for providing a regulated five volts DC.

14. The underwater communications system of claim 11 further characterized by a water tight housing having said light emitting diode and said light detecting unit mounted therein, said housing comprising:

a cylindrical shaped thermoplastic element for allowing infrared radiation to be transmitted therethrough; and an electrical coupling element in sealed engagement with the bottom end of said cylindrical shaped thermoplastic element;

the lower portion of said electrical coupling element being threaded.

* * * * *